Oct. 13, 1931.  A. L. BAUSMAN  1,826,980
CONFECTION MAKING MACHINE
Filed March 19, 1930  3 Sheets-Sheet 1
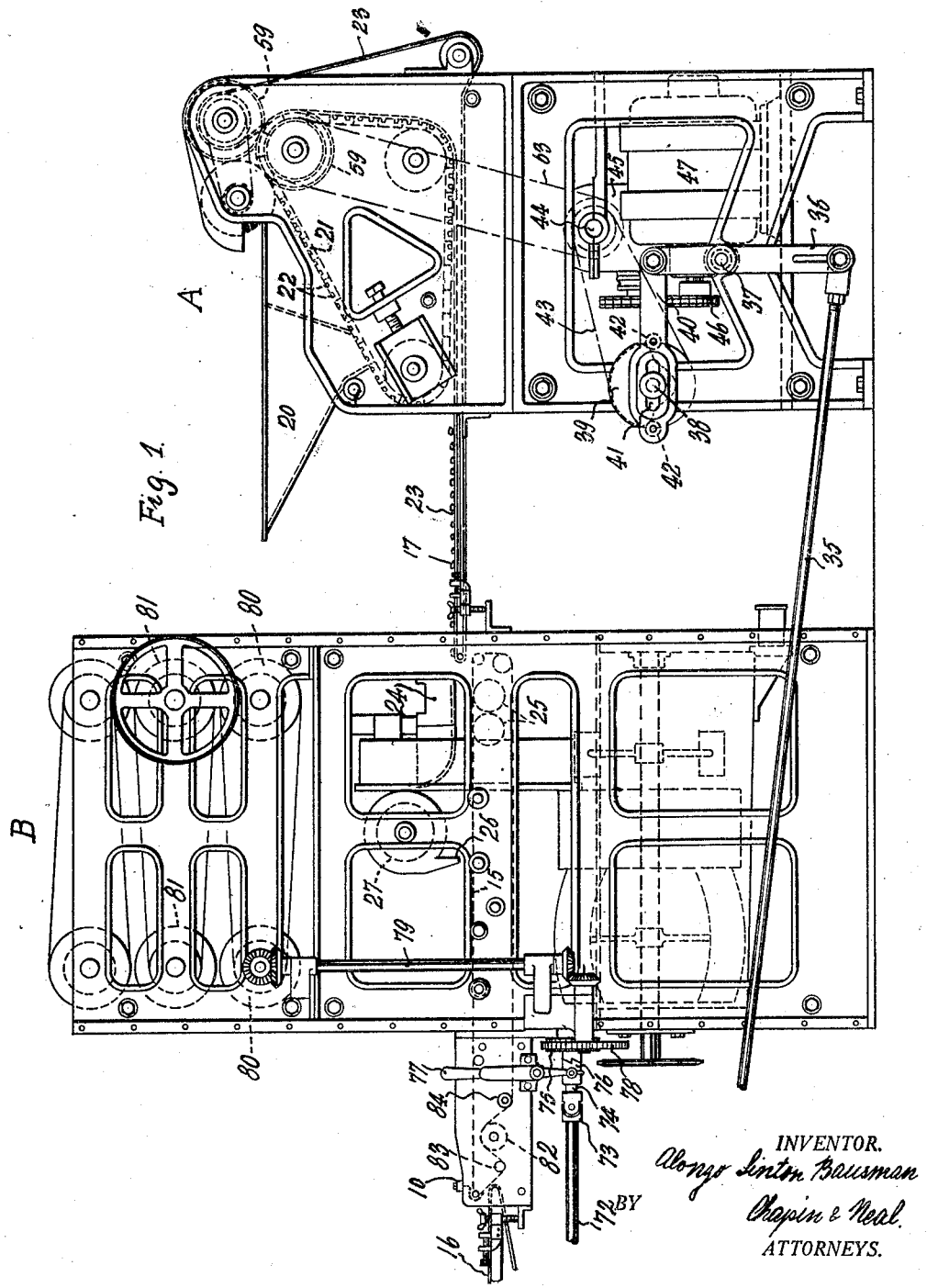
INVENTOR.
Alonzo Linton Bausman
BY Chapin & Neal.
ATTORNEYS.

Oct. 13, 1931.  A. L. BAUSMAN  1,826,980
CONFECTION MAKING MACHINE
Filed March 19, 1930  3 Sheets-Sheet 2
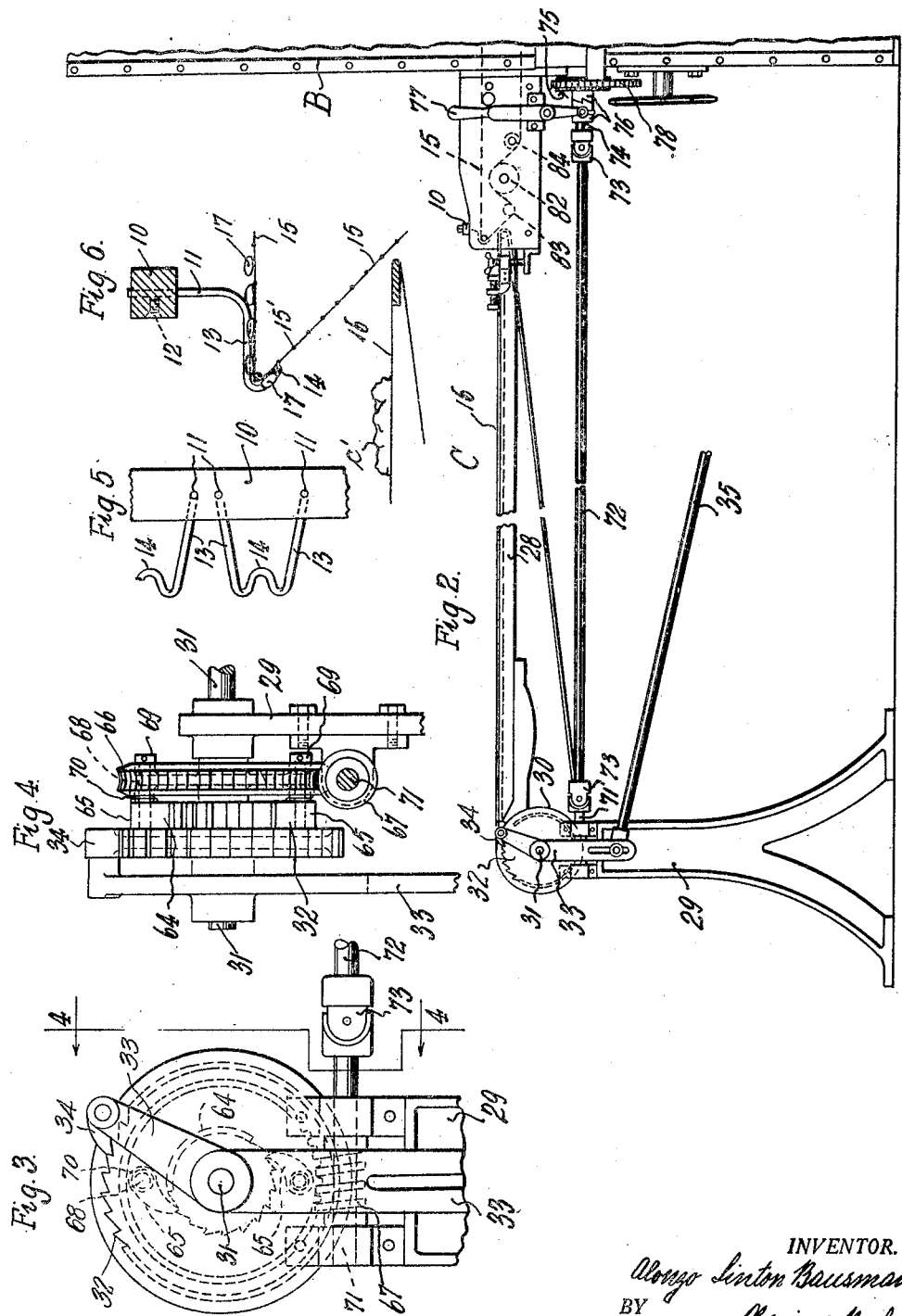
INVENTOR.
Alonzo Linton Bausman
BY Chapin & Neal
ATTORNEYS.

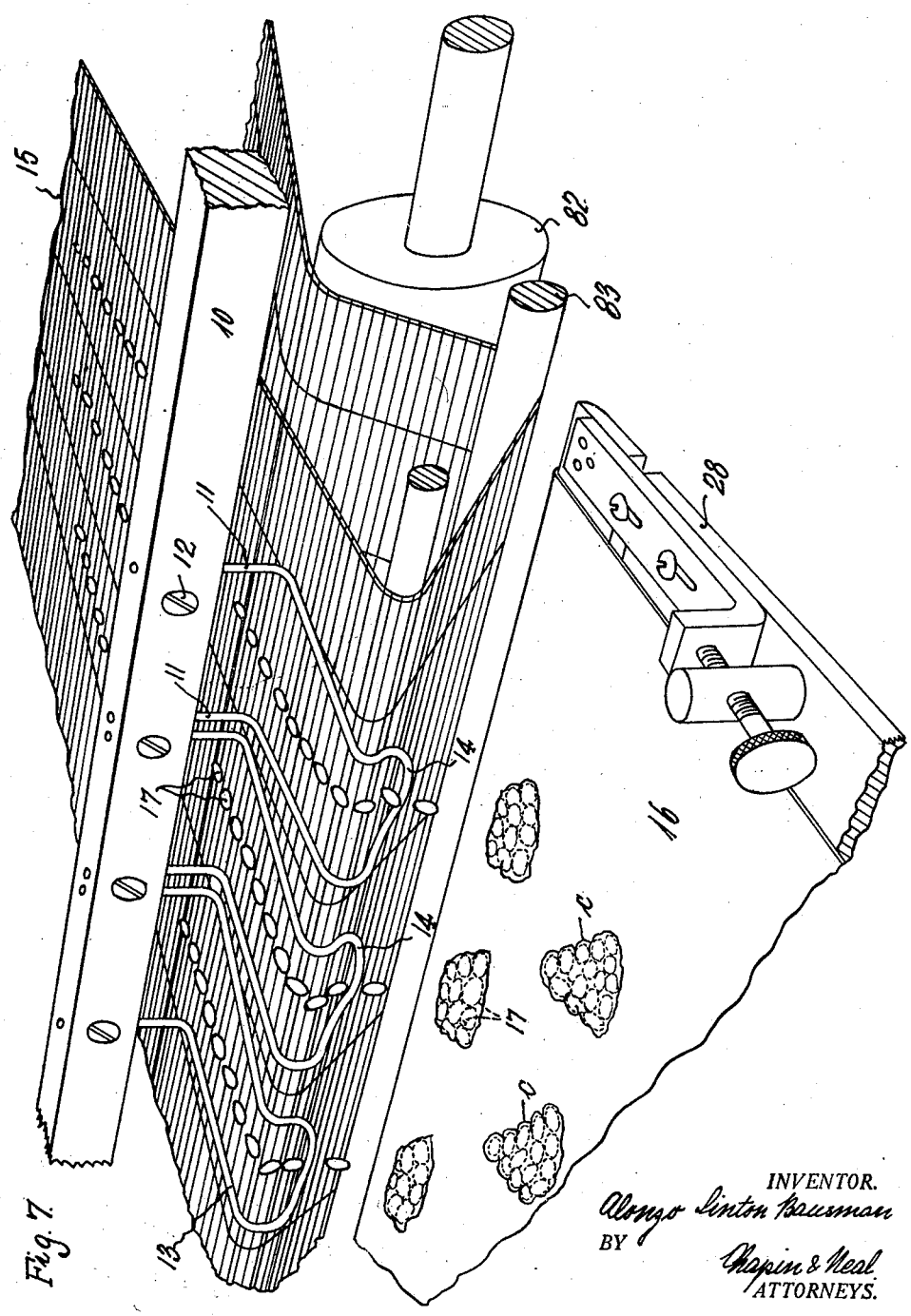

Patented Oct. 13, 1931

1,826,980

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

CONFECTION MAKING MACHINE

Application filed March 19, 1930. Serial No. 437,083.

This invention relates to confection making machines and, more particularly, to improvements in machines for making confection clusters.

In my prior U. S. Letters Patent, No. 1,761,065, dated June 3, 1930, I have disclosed a machine for doing this class of work. In that machine edible pieces, such as nuts for example, are individually fed to and coated by a confection coating apparatus of any suitable form. These pieces, individually coated with chocolate or any other suitable coating material, are carried by the conveyer of the coating machine to, and transferred upon, a delivery conveyer of any of the various known forms. The coated pieces drop successively on the delivery conveyer. The latter is driven intermittently in step by step fashion and, during each of its periods of rest, a predetermined number of the individually coated pieces pile up in a heap on the delivery conveyer, forming a cluster. The individual coatings, being at that time in plastic condition, merge wherever they contact and bind the units of the cluster together.

This invention has for one object an improvement in the machine of my prior patent, characterized by an arrangement for effecting variations in the relative speeds of the coating machine and delivery conveyers, whereby elongated clusters, such as fingers, strips or bars, as distinguished from the conventional "pile" type clusters, may be formed.

Instead of stopping the delivery conveyer during the delivery of a predetermined number of coated pieces, it may be made to move, although at a relatively slower speed than the conveyer of the coating machine. Thus, the cluster may be drawn out into elongated form. A number of the coated pieces will be delivered one after another in such closely spaced relation that successive units will adhere by their coatings and form a strip or bar cluster, instead of a pile type of cluster.

The invention has for another object to provide improved means for removing the individually coated pieces from the coating conveyer, characterized by a positive stripping of the pieces from the conveyer when they successively arrive at a predetermined point, thus insuring accuracy in the timing of the transfer of the pieces.

Other objects will appear as the detailed description proceeds and will be pointed out in the appended claims.

The invention will be disclosed with reference to the accompanying drawings, in which:—

Fig. 1 is a side elevational view of an apparatus, embodying my invention, a portion of the delivery conveyer being broken away on account of space limitations;

Fig. 2 is a similar view showing one form of delivery conveyer, which may be used with the apparatus of Fig. 1, and showing also the delivery end of such apparatus;

Fig. 3 is a fragmentary elevational view, taken similarly to Fig. 2, showing part of the driving mechanism for the delivery conveyer;

Fig. 4 is a view taken on the line 4—4 of Fig. 3;

Figs. 5 and 6 are top plan and elevational views, respectively, of the improved stripping device; and Fig. 7 is a fragmentary perspective view of a portion of the apparatus illustrative of the stripping and cluster forming operations.

In these drawings, I have shown a unit A (Fig. 1) for feeding the articles to be coated, a unit B for coating the articles, and a delivery unit C (Fig. 2) for receiving the coated articles. The clusters of coated articles are formed on the unit C, either in the manner disclosed in the prior patent or in the novel manner hereinafter pointed out.

The feeding unit A, may be of any type and form suitable for the purpose. As shown, it is exactly like that of the prior patent, to which reference is made for a full disclosure of its construction. For the present purposes a brief description will suffice. Peanuts or the like, contained in a hopper 20, drop into pockets 22 in a slat conveyer 21, which in one stretch moves in under and closes the bottom of the hopper. Certain slats of the conveyer are devoid of pockets. The other slats have rows of pockets and each pocket will hold one nut and no more. A belt 23 serves in part to close the filled pockets of the slat conveyer and in part as a feed belt for the coating machine. The nuts finally drop out of the pockets 22 upon the upper stretch of a horizontally travelling stretch of belt 23 and are carried thereby to, and dropped upon, the coating belt 15 of the coating machine B. The nuts are arranged by the feeder in a plurality of longitudinal rows on belt 23 (see Fig. 7) and each row will consist of a plurality of groups each comprising a suitable number of nuts to form one cluster,—the units of each group being equally spaced longitudinally. The feeder will also cause a larger longitudinal spacing between the last unit of one group and the first one of the next group, all as in the aforesaid patent.

The conveyers 21 and 23, as shown, travel continuously. They are driven by a motor 47 in the following, or any suitable manner. The motor drives through a sprocket chain 46 a transmission 45 and the driven shaft 44 of the latter is connected by a chain 63 to drive the slat conveyer. The latter drives through gearing 59 the belt 23.

The coating machine may be of any suitable type. A well known type of machine has been illustrated which, for present purposes, may be assumed to be in substance similar to that shown in Magniez Patent No. 735,890, dated Aug. 11, 1903. It includes in addition to the wire mesh belt 15, which carries the articles to be coated, a shower pan 24 to deliver a downward stream of coating, such as chocolate, to coat the articles as they pass therebelow. The usual bottom coating rolls are shown at 25 and there is also provided the customary fan 27 with a nozzle 26 to direct a downward blast of air on the freshly coated articles to remove superfluous coating. The operation of the machine B and the means for driving its various parts, including belt 15, will appear in the aforesaid Magniez patent, except for the particular mechanism indicated as supplying chocolate to shower pan 24,—such mechanism being of the type shown in the Carlson Patent No. 790,184 granted May 16, 1905.

The articles, coated in the apparatus B, are successively removed from belt 15 and transferred to the delivery unit C, which comprises essentially a belt 16 of any suitable form. The coated articles are delivered on belt 16 in such a way that groups of coated articles adhere, forming clusters, such as c' in Fig. 6 or c in Fig. 7. According to some features of this invention, the coated articles may be removed from belt 15 in the manner shown in my prior patent or in any other suitable manner. I prefer, however, to use the means shown in Figs. 5, 6 and 7 and such means constitutes an important feature of the invention, notwithstanding that there are other features which may be used independently of it. Such means insure improved accuracy in the timing of the transfer of the coated articles to belt 16 and accuracy in such timing, while important in any event, is more important where elongated clusters rather than pile type clusters are to be made. Either a belated or a premature delivery of one coated piece might break the continuity of the string of adhering coated pieces.

The means, just referred to, consists of stripping devices which are provided, one for each longitudinal row of clusters to be formed. The series of stripping devices are supported, as shown in Fig. 7, in transversely spaced relation from a cross bar 10 which overlies the upper stretch of belt 15 near the delivery end thereof. This bar is supported at its ends from the frame of the coating machine, as indicated in Fig. 2. Each stripping device may to advantage, be formed of wire bent into substantially hair pin form with the sides diverging from the central rounded end 14 thereof. The sides of the article, thus formed, are then bent as shown to afford two vertical parts 11 which are adjustably mounted in bar 10, being held in place by set screws 12 and two integral horizontal parts 13 which overlie the upper stretch of belt 15 in closely spaced relation. The remaining portions of said sides, which connect with the end 14, are bent to follow around the belt 15 as it passes from the end of its upper horizontal stretch of travel downwardly and enters its return stretch of travel. Each longitudinal row of peanuts 17, as it nears the delivery end of belt 15, will ride between the sides of the hair pin shaped stripping device and since these sides converge to the rounded end 14, the peanuts, if misaligned on belt 15, will be guided thereby and directed to the end 14, which exercises the stripping function. As the nuts 17 are covered with plastic chocolate, they cling to belt 15 and follow around with it as it travels in the steeply pitched path shown, which is downwardly and away from the belt 16. The belt 16, at its receiving end, underlies the stripper 14,—the inclined path of belt 15 permitting this arrangement. As each nut 17 is carried into a predetermined position by belt 15, and a position in which it has a clear path to fall upon belt 16, it strikes the stationary obstruction 14, and is stripped from belt 15 in a manner which will be obvious from Figs. 6 and 7. If desired and as shown, the tip end of the resiliently supported part 14 may be so located as to be engaged and vibrated by the cross wires 15' of belt 15, thereby insuring that the nuts will be shaken loose from the stripper and drop as intended. The location of the stripper 14 may be varied, if desired, as it is simply necessary to locate it at some point on belt 15 where the articles are suspended from the belt by their plastic coatings.

The delivery unit C, as shown, is similar to that shown in my prior patent and includes the belt 16, or its equivalent mounted in its upper stretch to travel over and be supported by a table 28 (Fig. 2). The latter is supported at one end from the coating machine B in the usual adjustable manner, or in any other suitable way, and at the other end by a standard 29. Mounted in this standard is the drive roll 30 for belt 16. Fixed to the shaft 31 of this roll is a ratchet 32 and pivotally supported by the same shaft is a lever 33, which at its upper end carries a pawl 34 to engage the ratchet. Lever 33 is connected by a link 35 to the lower end of a lever 36 (Fig. 1) pivoted at 37 to the frame of the feeding unit A. Also mounted in this frame is a shaft 38, carrying a cam 39. A link 40, slotted at 41 to slide on shaft 38, carries two rolls 42 to engage the periphery of cam 37 at diametrically opposite points. Shaft 38 is driven by a chain 43 from the shaft 44 of transmission 45. As pointed out in my prior patent, this mechanism is such as to work in timed relation with the nut feeder and impart intermittently a movement to belt 16. The arrangement is also such that these movements of the belt 16 occur during the intervals when no nuts are dropping from the delivery end of belt 15.

In order to form clusters of the elongated type, I provide another driving means for belt 16, which is best shown in Figs. 3 and 4. Fixed to shaft 31 and located adjacent ratchet 32 is a second and smaller ratchet 64, adapted to be driven by one or more pawls 65 carried by a worm gear 66, which is mounted to turn freely on shaft 31 and which is driven by a worm 67. Each pawl 65 is fixed to a stud 68 mounted to turn in gear 66 and held in place by a collar 69. A torsion spring 70, one end of which is fixed to pawl 65 and the other to gear 66, urges the pawl into engagement with the teeth of ratchet 64. The worm 67 is fixed to a shaft 71 mounted in bearings on pedestal 29, and shaft 71 is connected by a shaft 72 and the universal joints 73 to a shaft 74. This shaft is the usual one, provided as a part of coating machine B, for driving the delivery belt and may be connected to, or disconnected from, a driving gear 75 by a clutch 76, the movable element of which is operated by a lever 77. Gear 75 is driven by a gear 78 which, in turn, is driven through the bevel gearing and the vertical shaft 79 (shown in Fig. 1) from the driven one of a pair of cone pulleys 80. The latter form part of the speed transmission customarily provided in the coating machine, as disclosed in said Magniez patent, for varying the speed of the delivery belt.

The pair of cone pulleys 81 next above the pulleys 80 drive the wire belt 15 in the usual manner and enable its speed to be varied. The wire belt driving roll is designated 82 and its usual location in the coating machine has been changed to permit the sloping path of travel of belt 15 past the strippers 14. Idler rolls 83 and 84 are provided to cause belt 15 to have a sufficient area of driving contact with roll 82.

The delivery belt 16 is shown as an illustrative example of one means suitable for the purpose and may be considered as having a suitable smooth surface from which the coated confections may readily be peeled after they have hardened. This belt may be of any suitable length necessary to allow proper cooling of the finished confections, or it may pass through a cold box as shown in my U. S. Letters Patent No. 1,667,765, granted May 1, 1928. The apparatus of this patent may be substituted for that disclosed and driven in the manner herein described. Or, the belt 16 may carry waxed paper plaques, as disclosed in my U. S. Letters Patent No. 927,928, granted July 13, 1909. The machine, therein shown, may be substituted for the unit C herein shown, and driven in a similar manner.

In operation, either one or both of the driving means for belt 16 may be used. If the drive from shaft 74 only is used,—the drive from shaft 38 being disconnected in any suitable way,—the operation is the ordinary one. That is, the nuts are individually coated and delivered in spaced relation to belt 16. If the drive from shaft 38 only is used,—the clutch 76 being disengaged,—the belt 16 moves only intermittently, remaining stationary during a substantial interval and then moving through a substantial step. The operation, except for the stripping of nuts from belt 15, is then the same as in the machine of my prior application,—"pile" type clusters being formed on belt 16 while at rest, and the belt moving intermittently by large enough steps to separate successive clusters formed thereon.

The elongated clusters are formed by the use of both forms of drive herein disclosed. By moving lever 77 into the illustrated position, the worm gear 66 is made to turn continuously and the worm, through pawls 65 and ratchet 64, will drive belt 16 continuously. The speed of belts 15 and 16 may be independently varied to secure the desired results,—the speed of belt 16 being slower than that of belt 15 so that successive peanuts adhere. If the speeds of these belts are not greatly different, a long narrow finger-like cluster can be formed. That is, the peanuts may be deposited in a single row or line with successive peanuts adhering. By using a considerably slower speed, as is more often done, the peanuts, as deposited, can be made to pile up and overlap to form wider and thicker clusters which are nevertheless somewhat elongated as compared to the "pile" type cluster. The character of the clusters will, of course, vary with the speed of belt 16. As here shown, the peanuts which form one cluster are fed in one longitudinal row but the invention is not so limited and variations in the clusters may be formed by using more than one row of peanuts for the formation of each. After the last peanut of one longitudinal row has been stripped from belt 15 and dropped upon belt 16, the lever 33 is actuated and through pawl 34 turns ratchet 32 one step. This causes roll 30 to move at a much faster rate than it has theretofore been moved by the worm wheel. The result is that the last formed transverse row of clusters will be quickly moved ahead so that a space will exist between it and the next row of clusters subsequently to be formed on belt 16. It will be clear that the rapid motion of belt 16 is permitted because the teeth of ratchet 64 will pass freely past the pawls 65. In Fig. 6, I have indicated somewhat conventionally a relatively long and narrow finger like cluster c' while in Fig. 7, I have shown the so-called pile type clusters c. The two clusters, which have been illustrated, show substantially the two extreme types and there are many variations between these two extremes, which can be effected by variations in the relative speeds of the two belts.

The invention has been disclosed herein, in an embodiment at present preferred, for illustrative purposes but the scope of the invention is defined by the appended claims rather than by the foregoing description.

What I claim is:

1. In a confection making machine, coating means, a conveyer for carrying in longitudinally spaced relation the pieces coated by said means, a second conveyer for successively receiving the coated pieces from the first conveyer while their coatings are still plastic, and means for driving said conveyers and causing the second conveyer to move at a sufficiently slower speed than that of the first conveyer to cause the coated pieces successively delivered to the second conveyer to engage one with another and adhere by the merging of their plastic coatings.

2. In a confection making machine, coating means, a conveyer for carrying in longitudinally spaced relation the pieces coated by said means, a second conveyer for successively receiving the coated pieces from the first conveyer while their coatings are still plastic, means for driving said conveyers and causing the second conveyer to move at a sufficiently slower speed than that of the first conveyer to cause the coated pieces successively delivered to the second conveyer to engage one with another and adhere by the merging of their plastic coatings, and a second means for driving the second conveyer operable intermittently to move the second conveyer at a speed greater than that at which it is moved by the first-named driving means and sufficiently faster to produce periodic breaks in the continuity of the adhering coated pieces.

3. In a confection making machine, coating means, a conveyer for carrying in longitudinally spaced relation the pieces coated by said means, a second conveyer for successively receiving the coated pieces from the first conveyer while their coatings are still plastic, means for driving said conveyers and causing the second conveyer to move at a sufficiently slower speed than that of the first conveyer to cause the coated pieces successively delivered to the second conveyer to engage one with another and adhere by the merging of their plastic coatings, and intermittently operable means for producing relative accelerations in the movement of the second conveyer with respect to the first conveyer and thereby cause periodic breaks in the continuity of the adhering coated pieces.

4. A confection making machine, comprising, confection coating means, a conveyer for carrying in longitudinally spaced relation the pieces coated by said means, a second conveyer for receiving the coated pieces from the first conveyer while their coatings are still plastic, means for driving the conveyers continuously and the second conveyer at a speed sufficiently slower than that of the first so that coated pieces successively delivered by the first conveyer to the second conveyer will engage one with another and adhere by the merging of their plastic coatings, and intermittently operable means for accelerating the movement of the second conveyer sufficiently to produce breaks in the continuity of the adhering pieces.

5. A confection making machine, comprising, confection coating means, a conveyer for carrying in longitudinally spaced relation the pieces coated by said means, a second conveyer for receiving the coated pieces from the first conveyer while their coatings are still plastic, intermittently operable means for moving said second conveyer step by step, the coated pieces delivered to the second conveyer during each interval of rest thereof piling up and adhering by their plastic coatings into cluster form, and means for driving the second conveyer during intervals of rest of the first named driving means but at a speed slower than that of the first conveyer to cause the clusters of coated pieces to be elongated in form.

6. A machine for making confection clusters, comprising, a continuously movable conveyer, means for successively feeding thereto a series of pieces to be coated, means for coating said pieces while on said conveyer, an intermittently movable conveyer having one end in receiving relation with and at a lower level than the delivery end of said conveyer, whereby the coated pieces which successively drop from the first conveyer upon the second conveyer while the latter is at rest pile up one upon another and adhere to form a cluster, and means for driving the second conveyer during the periods when it would otherwise be at rest and at a speed slower than that of the first conveyer, whereby the clusters may be elongated in form.

7. In a confection coating machine, a conveyer which in its upper stretch of travel carries freshly coated confections and to which the latter cling as the conveyer turns and enters its lower stretch of travel, whereby the confections travel with the conveyer beyond the end of its upper stretch and assume positions in which they are suspended from the conveyer by their plastic coatings, a stripping device in the nature of an abutment located adjacent said conveyer to successively arrest the coated confections as they arrive at a predetermined one of said positions and cause them to fall from said conveyer, means underlying said device to receive the falling confections, and means for vibrating said abutment in a direction substantially normal to the conveyer.

8. In a confection coating machine, a wire mesh conveyer including cross wires, said conveyer in its upper stretch of travel carrying freshly coated confections and to which the latter cling as the conveyer turns and enters its lower stretch of travel, whereby the confections travel with the conveyer beyond the end of its upper stretch and assume positions in which they are suspended from the conveyer by their plastic coatings, a stripping device in the nature of a stationary but resiliently supported abutment located adjacent said conveyer to successively arrest the coated confections as they arrive at a predetermined one of said positions and cause them to fall from said conveyer, and means underlying said device to receive the falling confections, said abutment being successively engaged and vibrated by the cross wires of said conveyer.

9. In a confection coating machine, a conveyer which in its upper stretch of travel carries freshly coated confections and to which the latter cling as the conveyer turns and enters its lower stretch of travel, whereby the confections travel with the conveyer beyond the end of its upper stretches and assume positions in which they are suspended from the conveyer by their plastic coatings, a stripping device in the nature of an abutment located adjacent said conveyer to successively arrest the coated confections as they arrive at a predetermined one of said positions and cause them to fall from said conveyer, means for aligning the confections and guiding them to said abutment, and means underlying said device to receive the falling confections.

10. In a confection coating machine, a conveyer which in its upper stretch of travel carries freshly coated confections and to which the latter cling as the conveyer turns and enters its lower stretch of travel, whereby the confections travel with the conveyer beyond the end of its upper stretch and assume positions in which they are suspended from the conveyer by their plastic coatings, a member bent into hair pin form with the sides thereof diverging from the central rounded end thereof, said member supported so that said sides in part lie adjacent the upper stretch of said conveyer and in part bent around the delivery end of said conveyer so that said rounded end lies adjacent a part of the return stretch of the conveyer, said sides forming guides converging toward said rounded end to receive the coated confections therebetween and direct them to said rounded end, the latter serving to strip the coated confections from the conveyer, and means underlying said rounded end to receive the confections removed from said conveyer.

In testimony whereof I have affixed my signature.

ALONZO LINTON BAUSMAN.